July 5, 1932.  E. A. ROCKWELL  1,865,644
POWER UNIT
Filed June 20, 1931
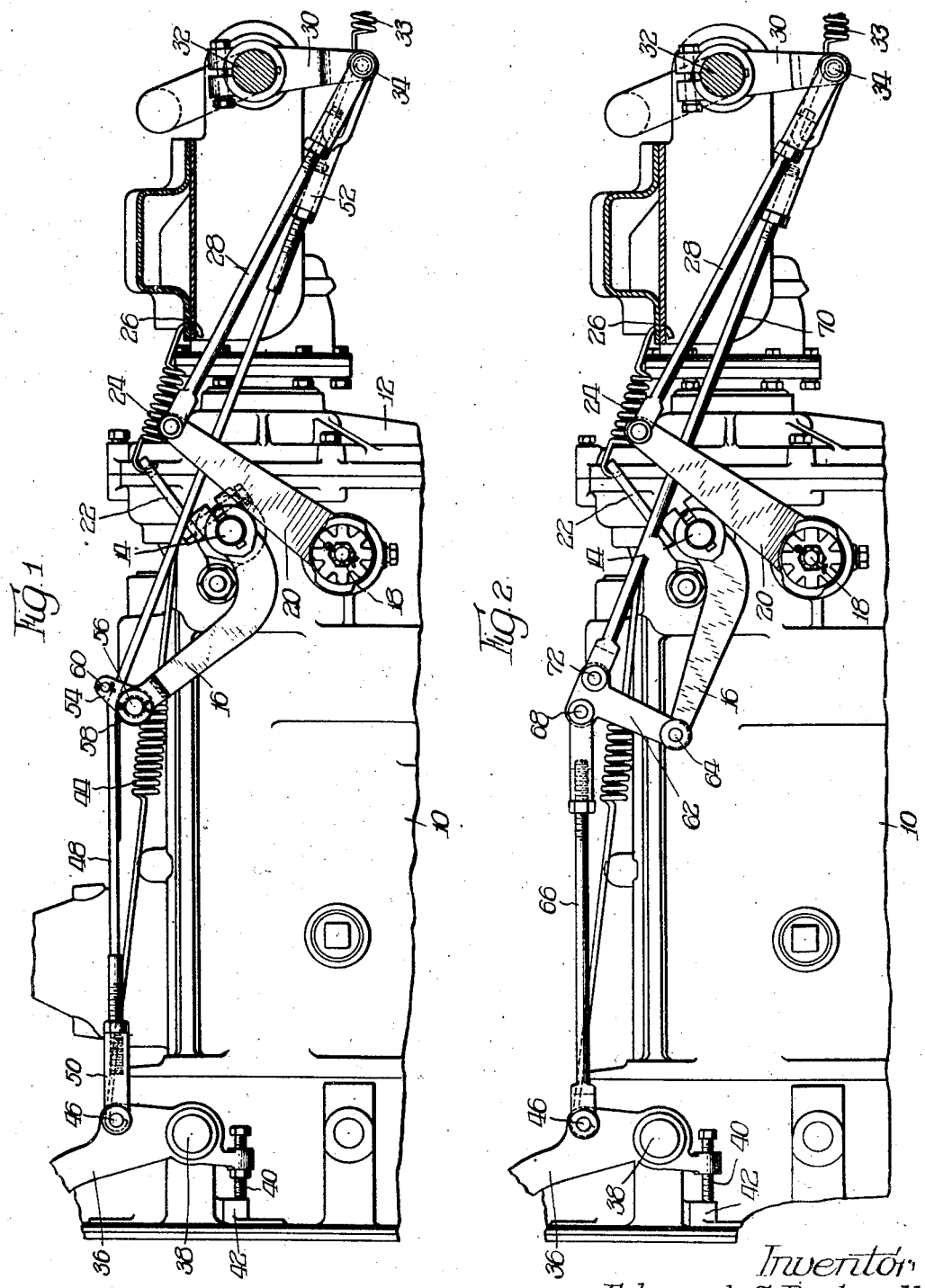
Inventor
Edward A. Rockwell, Patented July 5, 1932

1,865,644

UNITED STATES PATENT OFFICE

EDWARD A. ROCKWELL, OF CHICAGO, ILLINOIS

POWER UNIT

Application filed June 20, 1931. Serial No. 545,709.

This invention relates to improvements in a brake linkage and particularly to a linkage in which a pedal is connected directly for actuation of the wheel brakes and is so arranged that a component of pressure tends to produce actuation of a power brake which, if effective, will actuate the wheel brakes independent of the direct actuation by the pedal.

It is a purpose of the present invention to provide a pedal connected by a cable or by pull rods to a brake actuating cross shaft and to provide power braking mechanism intermediate the pedal and cross shaft on which the output lever is connected to the cross shaft and the input lever is so arranged as to receive a component of pressure from the cable or pull rods which connect the pedal to the cross shaft.

It is a feature of the invention that in normal operation movement of the pedal will immediately produce actuation of the power braking mechanism which thereby actuates the cross shaft to apply the wheel brakes of the vehicle but if the power brake mechanism is ineffective, due to failure of the parts or due to the fact that the vehicle is not in motion, the movement of the pedal will directly actuate the cross shafts for applying the wheel brakes.

Further objects and advantages of the invention will be more readily apparent from the following detail description taken in connection with the attached drawing, in which:

Figure 1 is a side elevation of the brake linkage;

Figure 2 is a side elevation of a modified design.

There is illustrated in the drawing an outside view of a transmission housing 10 having a built-in power brake of a type which may correspond to that shown and described in the application of Rockwell and Garancher, Serial No. 519,999, filed March 4, 1931. The end plate 12 serves as a closure for the portion of the housing 10 which contains the power brake and forms an anchor to receive a portion of the power brake reaction. As is customary, the power brake includes input and output rock shafts arranged transversely to the propeller shaft of the vehicle and generally above and below the propeller shaft. The input rock shaft 14 has secured to its protuding end a lever 16 while the output rock shaft 18 carriers a lever 20. It is to be understood that the rotation of the input rock shaft 14 in a counter-clockwise direction will produce retardation of a power brake element normally rotatable with the propeller shaft and the retardation of the braking member with respect to the propeller shaft produces movement tending to rotate the output rock shaft in a counter-clockwise direction.

The lever 16 has secured thereto an extension arm 22 connected by tension spring 24 to the chassis frame 26. The spring 24 holds the input rock shaft normally in released position. The output lever 20 is pivotally connected by an adjustable pull rod 28 to a brake applying lever 30 which, as shown in the present embodiment, is carried by a brake operating rock shaft 32. The actuation of the rock shaft 32 serves to apply the wheel brakes and any suitable connections can be provided between the rock shaft and the brakes. There is shown a spring 33 connected to the pivotal connection 34 of the pull rod 28 to lever 30 and extending to some fixed point. The spring 33 serves to hold the output brake linkage normally in released position and it is to be understood that similar resilient means may be used at the wheel brakes or at any other point throughout the output brake linkage.

It is my intention to have the spring 33 act with a greater effectiveness than spring 24 in cooperation with the lever arms in order that there will be an initial actuation of the power brake by movement of the brake pedal, as will be later described. I show a brake pedal 36 supported on a pivot 38 fixed with respect to the engine frame. The pedal 36 is provided with an adjustable stop 40 adapted to come into engagement with a fixed abutment 42 to determine the normal released position of the brake pedal. The brake pedal is held in normal released position by a tension spring 44 extending between a fixed connection to the housing 10 and a pivotal connection 46 to the brake pedal. The description as thus far given is equally applicable to the modification shown in Figure 2.

In Figure 1, I provide a flexible cable 48 joined at one end by the connection 50 to the brake pedal and at the other end by connection 52 to the brake applying lever 30. The cable is guided at an intermediate point by passing between the arms of a yoke 54 formed integral with the lever 16 which also carries a pin 56 supporting a roller 58 against which the cable bears. Displacement of the cable from between the arms of the yoke 54 is prevented by pin 60. It is obvious that the pin 56 carried by lever 16 in the normal released position of the lever is offset with respect to a straight line between the cable connections 50—52. Therefore, actuation of the brake pedal will transmit a component of pressure from the cable to the lever 16 and tend to impart a counter-clockwise actuation movement to the input rock shaft 14.

As previously stated it is intended that the spring 24 will yield prior to spring 33 and therefore upon actuation of the brake pedal the power brake will be brought into action to apply the brakes instead of directly actuating the brakes by initial movement of the rock shaft 32 from actuation of the pedal. It is to be understood that the power brake requires only a very light pressure to be brought into action. When the power brake operates and the output lever 20 is turned in a counter-clockwise direction, thereby applying the wheel brakes through movement of the rock shaft 32, the tension upon the cable will be relaxed since the pivotal connection 34 will move towards the pivotal connection 46 and therefore the input pressure to the power brake will decrease unless the operator moves the brake pedal to compensate for the decrease in effective pressure. This action tends to render the application of the power brake smooth and effective. When all the slack in the brake linkage from the rock shaft 32 to the wheel brakes has been taken up, the pivotal connection 34 carried by the lever 30 will become substantially a fixed point and the pressure applied to the brake pedal will be divided into a component holding the power brake in applied position and a component tending directly to assist the braking action.

It is an advantageous feature of this construction that the wheel brakes can be applied directly by the operator in case of any failure of the power braking mechanism and also actuation of the power braking mechanism does not affect the position of the pedal since the cable may take care of lost motion.

The arrangement disclosed in Figure 2 includes a rigid pull rod connection instead of a cable between the pivot points 34 and 46. I show a sub-lever 62 supported by a pivot 64 carried by lever 16. An adjustable pull rod 66 extends between the pivotal connection 46 to the pedal and a pivotal connection 68 to the sub-lever 62. A second adjustable pull rod 70 extends between the pivotal connection 72 to the sub-lever and the pivotal connection 34 to the brake lever 30. The action of this arrangement is substantially the same as in Figure 1 except that the actuating movement of the brake applying rock shaft 32 will directly move the pedal in a releasing direction. If the power braking mechanism is ineffective the pivot 64 of lever 16 becomes fixed and direct actuation of the wheel brakes can be obtained by movement of the pedal since the sub-lever 62 will rock with respect to the pivot lever 64.

In both forms of the invention during the actuating movement of the input lever of the power brake a component of pressure transmitted from the pedal to the lever 16 becomes progressively less as the cable tends to straighten or as the pull rods tend to come into alignment. This feature is advantageous in connection with the power brake since it prevents over-application of the wheel brakes.

I claim:

1. Brake mechanism for vehicles comprising in combination a pivoted brake pedal, a brake actuating rock shaft, a power brake intermediate the pedal and rock shaft, input and output levers associated with said power brake, a connection from said output lever to said rock shaft and an independent connection from said pedal to said rock shaft, said independent connection being so arranged as to transmit a component of pressure to said input lever.

2. Brake mechanism for vehicles comprising in combination a brake pedal pivoted on the vehicle, a brake actuating rock shaft supported by said vehicle, power brake mechanism associated with the propeller shaft of the vehicle intermediate said pedal and said rock shaft, an input lever for actuating said power braking mechanism, an output lever for transmitting amplification of the braking effort from the power braking mechanism, a connection from said output lever to said rock shaft and an independent connection from said pedal to said rock shaft arranged to transmit a component of pressure to said input lever and movable with respect to said input lever whereby said rock shaft may be actuated by said pedal independent of the power brake mechanism.

3. Brake mechanism for motor vehicles comprising in combination a pivoted brake pedal, a pivotally supported brake actuating rock shaft, power amplification means intermediate said pedal and said rock shaft, pivoted input lever associated with said power amplification means, a pivoted output lever associated with said power amplification means, a connection from said output lever to said rock shaft, independent means connecting said pedal to said rock shaft, resilient means for normally holding said rock shaft in inoperative position, resilient means normally holding said input lever in inoperative position, said independent connecting means being so arranged as to initially transmit movement to said input lever without movement of said rock shaft but being effective to produce movement of said rock shaft should the power amplification means fail to operate.

4. Braking mechanism associated with a vehicle comprising a pivoted braking pedal, a pivoted brake actuating rock shaft, a lever arm secured to said rock shaft, a cable connecting said pedal to said lever arm for actuating said rock shaft, power braking means associated with the vehicle intermediate said pedal and said rock shaft including pivoted input and output levers, a connection from said output lever to said rock shaft, resilient means for normally holding said input lever in inoperative position, said cable being guided for movement by said input lever and effective to produce a component of pressure tending to actuate said input lever upon the application of braking pressure to said pedal whereby said power braking mechanism is operable to proportionately amplify the braking pressure and produce actuation of said rock shaft and said rock shaft may be actuated directly from said pedal independent of said power braking mechanism.

5. Brake mechanism for motor vehicles comprising in combination a pivoted brake pedal, a pivoted brake actuating rock shaft, a lever arm carried by said rock shaft, means directly connecting said pedal to said lever, power brake mechanism, a pivoted input lever actuated by said power brake mechanism arranged to receive a component of pressure from said connecting means between the pedal and the rock shaft and adapted upon actuating movement to progressively decrease the effective component of pressure and an output lever operated by said power braking mechanism connected to said rock shaft.

Signed at Chicago, Illinois, this 17th day of June, 1931.

EDWARD A. ROCKWELL.